Patented Mar. 30, 1937

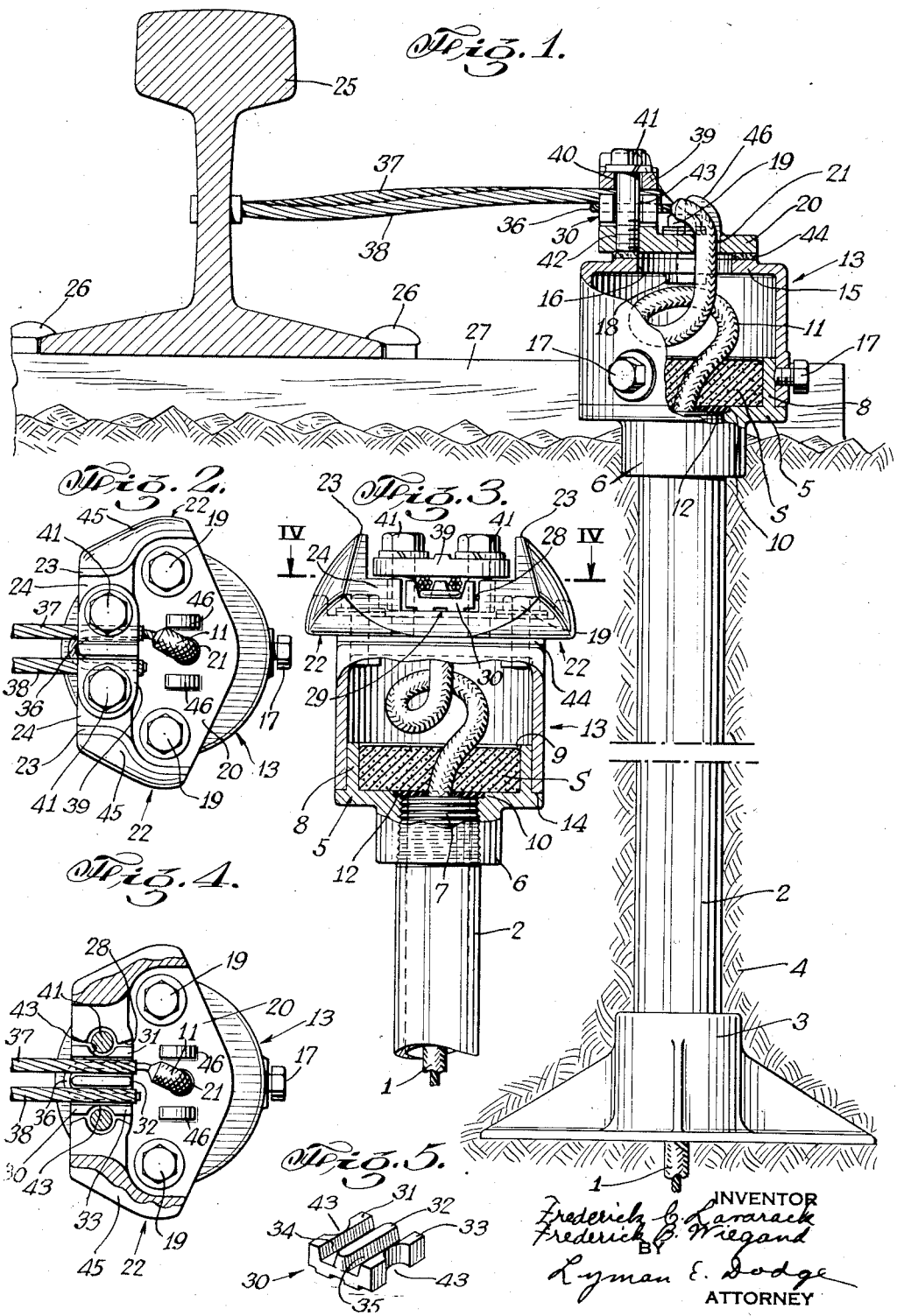

2,075,780

UNITED STATES PATENT OFFICE 2,075,780

CABLE RISER

Frederick C. Lavarack, Montclair, N. J., and Frederick B. Wiegand, Cleveland, Ohio, assignors to Railroad Accessories Corporation, New York, N. Y., a corporation of New York Application September 19, 1934, Serial No. 744,624

3 Claims. (Cl. 247—1)

This invention relates to electrical conductors, particularly to connectors therefor, and more especially to connectors especially adaptable for use in railway track circuit signalling.

As is well understood by those skilled in the railway signalling art, electrical conductors are attached to the rails at intervals. These conductors of necessity must be either on or in the ground. In general they are placed in what is called "trunking", which is merely a wooden or metal conduit. Of late, many of these conductors have been of the form known as "parkway cable". These cables are buried in the ground without protection, such as trunking, and emerge from the ground close to the point on the rail at which they are to be connected. Upon emerging from the ground, the wire or conductor within the cable is laid bare and connected to some form of bond wire and pin for connection to the rail. Laying bare the conductor of the cable renders the cable subject to the entrance of moisture and water which might destroy it, therefore, this end must be protected. The exposed wires are also likely to be pulled about or bent by laborers working on the track, and are subject to injury by objects falling from passing trains, or dragged thereby along the parkway, and adequate mechanical protection must be provided against such injuries.

Various means have been employed to protect the end of the parkway cable. These have generally assumed the form of a vertical conduit or riser within which the parkway cable is positioned as it is brought vertically upward in the ground to be connected above the ground with the desired object or device. Such a construction is illustrated in the patent to F. C. Lavarack et al., No. 1,665,629, dated April 10, 1928, and somewhat analogous construction serving a somewhat similar purpose is shown in the patent to F. C. Lavarack et al., No. 1,887,272, dated November 8, 1932.

A principal object of the present invention is to provide a construction of the general nature specified, suitable for analogous purposes to those mentioned, which will afford means for making connections to a parkway cable.

A more particular object of the invention is to provide a construction in which the basic riser structure may be first installed rapidly without the need for special attention to the completion of the essential or desirable sealing and mechanically protective elements of the device.

A further object of the invention is to provide an improved finial element which can be applied to the basic riser structure readily after the above-mentioned preliminary installation of the latter, and which includes a novel cover member which affords ample mechanical protection to the seal, is weather proof, and serves as a base for the various components required for completion of the electrical connections; serving also to support novel means to yield improved protection of the electrical connections against injury by objects dragging along the parkway or falling thereon, and against the above mentioned injury by laborers.

In describing the invention in detail and the particular physical embodiment selected to illustrate the invention, reference will be had to the accompanying drawing, and the several views thereon, in which like characters of reference designate like parts throughout the several views, and in which:

Figure 1 is a cross-sectional view of a portion of trackway, track rail, and parkway, with a parkway riser, parkway riser protector and a connector attached to the parkway cable, constructed in accordance with applicants' invention, some of the parts being shown in elevation and broken away and sectioned to more clearly show the construction; Fig. 2 is a top plan view of the connector as shown in Fig. 1; Fig. 3 is a view in side elevation of the upper portion of the device as shown by Fig. 1, partly broken away and sectioned to reveal interior structure; Fig. 4 is a cross-sectional view of the device as shown by Fig. 3 on the plane indicated by the line IV—IV viewed in the direction of the arrows at the ends of the line; Fig. 5 is a detail view in perspective of one of the electrical connector elements, shown separately.

Numeral 1 designates a parkway cable. This cable is used to make electrical connection between two bodies or pieces of apparatus. In railway practice, it is generally buried in the ground and upon being brought up out of the ground it is usual and quite necessary to protect it so that it will not be affected by weather conditions.

The emergent, vertical part of the parkway cable 1 is shown as protected by a duct called a "parkway riser", preferably an iron pipe 2. This pipe 2 extends a desirable or necessary distance into the ground and so protects the end of the parkway cable 1 which approaches close to the surface of the ground.

In practice it is desirable to also anchor the duct 2 by means such as a base member 3. This base furnishes a larger anchorage body which is more certain to remain in a fixed position in the earth 4.

Upon the upper end of the pipe 2 is preferably screwed a "pot" 5 having a base 6 interiorly threaded to fit upon the threaded end 7 of the pipe.

By the annular flange 8, a cavity 9 is formed above the upper end of pipe 2, and in communication therewith through a suitable orifice 10, through which passes the free end 11 of the cable, of a suitable length to be used in completing the desired electrical connections. The wall of the orifice 10 may be countersunk, as illustrated, to receive an insulating washer or spacing member 12, to centralize the cable 11 and close the end of the pipe 2.

In pursuance of the invention, a cooperating "cover-pot" or cover member 13 is provided, being inverted and fitted over the flange 8, which is preferably of suitable diameter to leave a supporting ledge 14, thus providing a snug waterproof joint at this region. The upper end wall 15 of the cover-pot (see Fig. 1) has an orifice 16 of suitable size to pass the cable end 11 and to permit easy inspection of the interior.

The side walls of the cover-pot are tapped at spaced intervals to permit set-screws 17 to be screwed in against the flange 8, for retaining the cover-pot in place. The end wall 15 may desirably have diametrically opposite thickened portions 18, tapped to receive bolts 19 for attachment of a base plate 20, and this base plate serves as a closure for the orifice 16 and supports the various components of the electrical connections, to which the free end 11 of the cable is led through a central orifice 21, the latter being preferably restricted to a dimension just sufficient to pass the cable, with its insulation.

This base member 20 may desirably be extended laterally to project beyond the end wall 15 of the cover-pot 13 at opposite sides, thus forming wings 22, the outer faces of which curve convexly upward and inward from their extreme outer dimension to their upper margins 23. These upper margins are shown as of approximately ogee shape, being sufficiently far apart at their region of greatest width to clear the bolt heads 19, and to serve as protecting walls for the latter. At their other ends the margins 23 are nearer together, and between them extends a transverse wall 24, of less height than the margins 23 and which serves as a barrier against the intrusion of extraneous objects from the side adjacent to the rail 25, the latter being shown as spiked at 26 in usual fashion to the tie 27 (see Fig. 1).

In the said barrier 24 is formed a notch 28, the bottom 29 of which may desirably be at a slightly higher level than that of the upper plane surface of the base plate 20, and on this bottom 29 is seated a member 30, which is best seen in Fig. 5, this serving as the lower component of the electrical connections. The member 30 is preferably made of brass, or equivalent relatively soft, bright electrically conductive metal, and is approximately W-shaped in cross-section, so that it presents upwardly three parallel ridges 31, 32, 33 with intervening grooves 34 and 35 having walls inclined inwardly and downwardly.

These grooves serve to receive the bared end 36 of the cable, which is formed into a U-shaped terminal, as shown in Figs. 2 and 4, and preferably lies in the narrower bottom regions of the V-shaped grooves. Above this U-shaped terminal 36, the grooves are adapted to receive the ends of the conventional pair of twisted track connectors or cables 37 and 38, which are usually of somewhat larger diameter than the cable end 36 with which they contact electrically, one on each side of the middle ridge 32, and so they project somewhat above all of the ridges (see Fig. 3).

Above the assembled conductors is a plate or member 39 of sufficient length to overlie the member 30 with the conductors therein confined, and also long enough to have orifices 40 through which extend retaining bolts 41 that are screwed into appropriate threaded sockets 42 tapped in the base plate 20.

The plates 20, 30 and 39 may thus desirably form a unitary structure, connected by the bolts 41, so that when removed from the cover-pot 13, they may be kept together. The member 30 is shown as having side grooves 43 which afford clearance for the bolts, but are not large enough to permit the member 30 to fall out of the assembly when removed from the cover-pot.

A gasket 44 may desirably be interposed between the cover-pot and the base plate 20.

It is to be noted that the upper margins 23 of the wings on the base plate are approximately of the same height as the heads of bolts 41, so that these margins and the bolt-heads form an effective top barrier to ward off injury by objects falling from trains or dragged thereby along the parkway, and when the parkway riser is fairly near to the rail 25, any flat object dragged by a train is likely to bridge the space between the rail head and the upper end of the riser, so that the upwardly convex wing surfaces 45 will tend to ease such a moving object safely over the riser structure, as well as away from the conductors 37 and 38.

The plate 20 may also be provided with shorter projections 46, of a height suitable to afford similar protection to the emergent cable 10.

In the installation of a parkway riser constructed in accordance with the invention as above disclosed, the riser duct 2, with its anchor 3 attached, is set in the parkway in the usual manner, the cable 1 having first been drawn therethrough and the port or head 5 is screwed onto the upper end of the duct, after drawing the free cable end 11 through the orifice 10.

The operation of sealing may then be performed readily, by pouring a suitable bituminous sealing material S into the cavity 9 formed by the flange 8, after first placing a washer 12 over the cable end and fitting it in the countersunk seat surrounding the orifice 10. In the absence of the cover pot 13, the sealing operation, and all the necessary preliminary work upon the cable 11, including the formation of a suitable coil therein, as shown at 11, can be performed with unusual ease.

The "cover-pot" 13 is then fitted over the flange 8, and secured by set screws 17, the free end 11 of the cable being threaded through orifice 16 in the upper end wall of the cover-pot. Then the gasket 44 and base plate 20 are superimposed upon the cover-pot in the order named, the cable end 11 being threaded through the orifice 21 of the base plate, and the latter is secured in place by the bolts 19.

The cable 11 having already been coiled to give a free end portion of suitable length, which may be predetermined, and its terminal 36 being bared and brightened, as usual, it is ready for replacement, with the free ends of conductors 37 and 38, in assembled relation with the connector plates 30 and 39, the last mentioned plate having preferably been removed, with the bolts 41, to clear the upper surface of plate 30 for reception of the U-shaped terminal loop 36 of the cable. After this loop has been fitted in the grooves 34, 35, and around the middle ridge 32 of plate 30, the ends of conductors 37, 38 are fitted in as indicated in Fig. 4, and the electrical connection is completed by addition of the plate 39 and driving in the bolts 41 to tighten up the assembly.

From the hereinbefore given description it will be seen that applicant has provided a parkway riser of sturdy structure, capable of excluding moisture from the parkway cable, and of withstanding mechanical shocks and warding them off so that the various conductors and their mechanical and electrical connections will be preserved free from injury; also that the novel structural parts and their mode of assembly permits the various steps of installation to be performed with unusual freedom and celerity, including the preliminary work upon the cable, the provision of the inner seal S therefor, and the emplacement of the mechanical and electrical protecting means, and the assembly and completion of the connections.

The electrical connection between the conductors is one which is likely to remain for a long time in good condition, but which, if defects develop, is so constructed that all parts may be readily inspected, adjusted and/or replaced.

Although we have particularly described one particular physical embodiment of our invention and explained the operation, construction and principle thereof, nevertheless, we desire to have it understood that the form selected is merely illustrative, but does not exhaust the possible physical embodiments of the idea of means underlying our invention.

What I claim as new and desire to secure by Letters Patent of the United States, is:

1. In a parkway riser for cable, in combination: an upright duct, a head pot member mounted thereon and adapted to pass the cable and having a deep recess to receive and support locally a seal of plastic material for the joint between said duct and pot, a removable cover-pot adapted to be assembled invertedly upon said head pot member and means to secure said pots together in moisture proof union, said cover-pot having a cavity adapted to contain a coiled portion of said cable of considerable dimensions and having also an upper end wall with an aperture adapted to pass the free end of the cable and of sufficient size to permit inspection of the part thereof confined by the pots, said end wall being adapted to support a closure plate serving as a base for the components of electrical connections between said cable end and the conductors to be assembled therewith.

2. A parkway riser having the elements combined and cooperating as set forth in claim 1, and further characterized by having a closure plate, a plurality of electrical connector plates assembled in vertical relation thereon with said cable and conductors, and means to hold said plates together to constitute a unitary structure removable as such from said removable cover-pot and from said cable and conductors, and means to secure said unitary structure to said cover-pot.

3. A head-pot structure for a cable parkway riser, comprising, in combination, a cup-shaped head-pot member having an attaching portion adapted to be fitted to an upright duct containing a cable, and having a deep recess to receive and support locally a seal of plastic material around the portion of said cable emerging from said duct and traversing said recess; and a removable cover-pot adapted to be assembled invertedly upon said head-pot member, said cover-pot having an upper end wall with an aperture adapted to pass the free end of the cable, said end wall being adapted to support a closure plate serving as a base for the components of electrical connections between said cable end and the conductors to be assembled therewith, said cover-pot having also a cavity adapted to contain in coiled form a portion of said cable of sufficient length to permit said cover-pot to be removed from said head-pot for inspection of said seal, and associated cable parts, while said exterior electrical connections between said cable and exterior conductors are maintained.

FREDERICK C. LAVARACK.
FREDERICK B. WIEGAND.